United States Patent [19]

La Bianca

[11] 4,307,759
[45] Dec. 29, 1981

[54] BATCH MATERIAL BLENDER AND METHOD THEREFOR

[75] Inventor: Vincent S. La Bianca, Cranston, R.I.

[73] Assignee: Dart Industries Inc., Los Angeles, Calif.

[21] Appl. No.: 83,005

[22] Filed: Oct. 9, 1979

[51] Int. Cl.³ .............................................. B65B 1/04
[52] U.S. Cl. ........................................ 141/9; 141/284; 141/100; 222/1; 222/252; 222/308; 222/361
[58] Field of Search ............... 425/166, 162, 562, 580, 425/582, 583, 256, 257, 447, 448, 472; 141/9, 1, 100, 103, 104, 105, 107, 284; 222/288, 1, 252, 140, 361, 307, 308

[56] References Cited

U.S. PATENT DOCUMENTS

| | | | |
|---|---|---|---|
| 271,736 | 2/1883 | Platman | 222/140 |
| 830,542 | 9/1906 | Trump | 222/140 |
| 830,543 | 9/1906 | Trump et al. | 222/140 |
| 2,161,190 | 6/1939 | Paull | 222/252 |
| 2,865,447 | 12/1958 | Kaufman | 222/288 |
| 2,879,042 | 3/1959 | Jones | 222/252 |
| 3,031,109 | 4/1962 | Krag | 222/252 |
| 3,463,360 | 8/1969 | Dorfman | 222/288 |

Primary Examiner—Houston S. Bell, Jr.
Attorney, Agent, or Firm—Leigh B. Taylor

[57] ABSTRACT

A measuring and transferring device for automatically metering predetermined and variable quantities of virgin plastic material, reprocessed plastic material and color concentrate to an extrusion machine. This masterbatch material blender incorporates a rotary conveyor having openings therein that receive and retain predetermined amounts of virgin plastic material and color concentrate in one position of movement of the conveyor and discharge same to the extruder in yet another position of movement thereof. Furthermore, such conveyor is adapted to control yet another reciprocable metering and transfer mechanism that similarly controls the addition of reprocessed material to the batch by way of the same measuring and transferring device.

20 Claims, 11 Drawing Figures

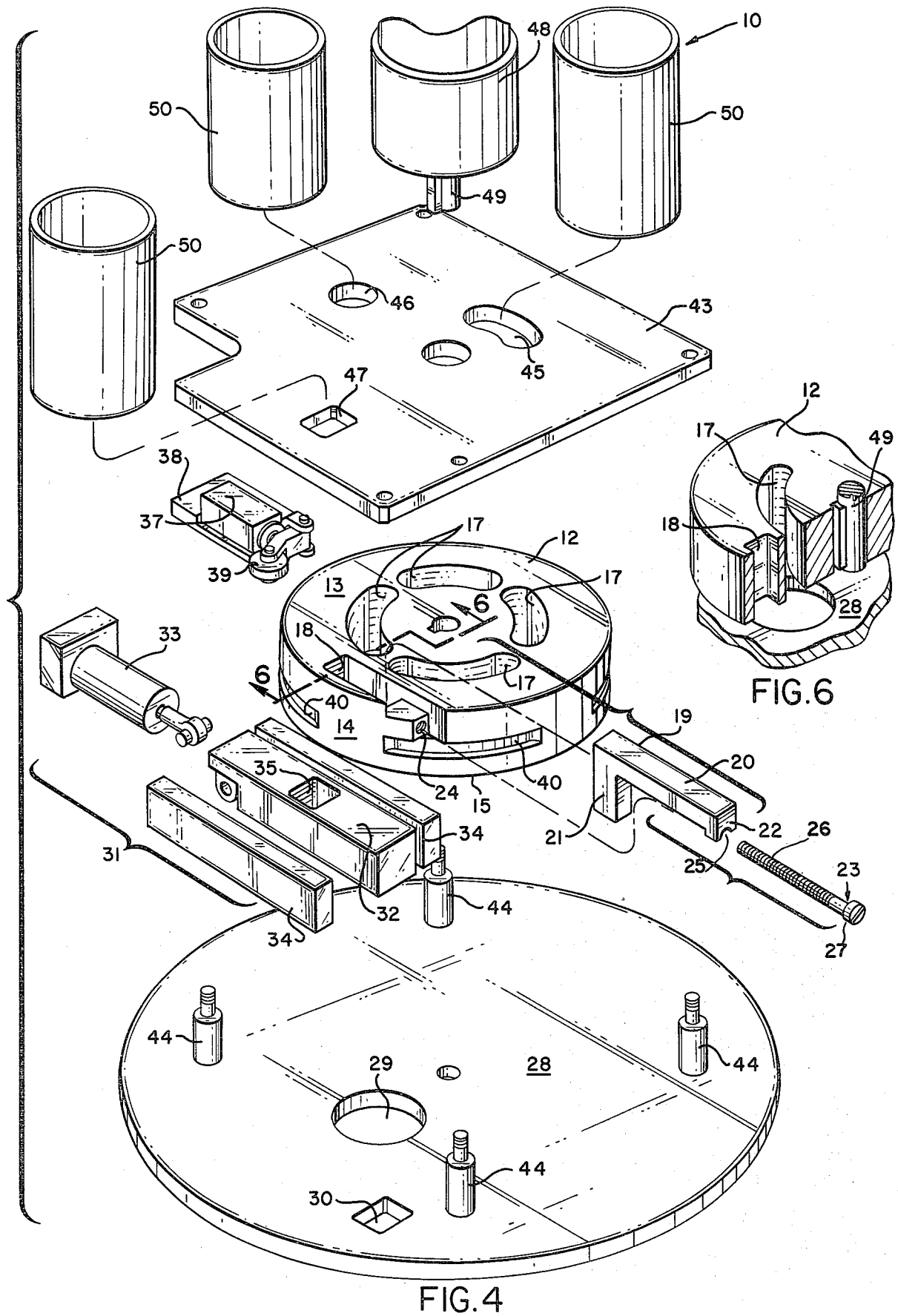

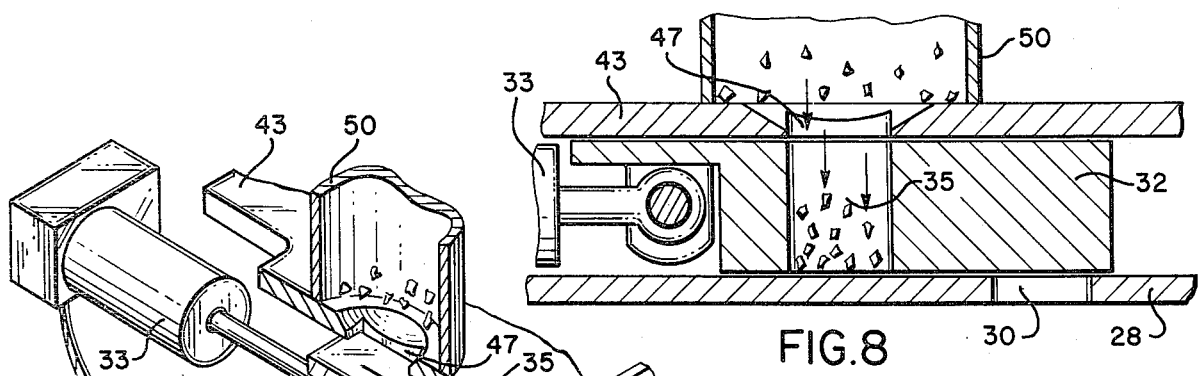
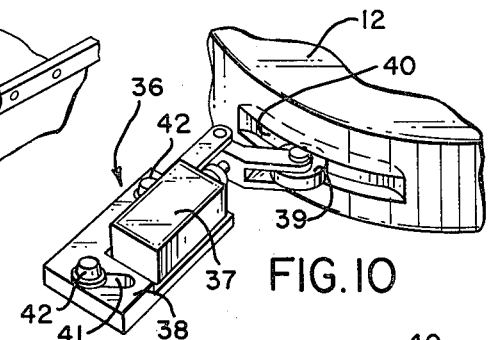
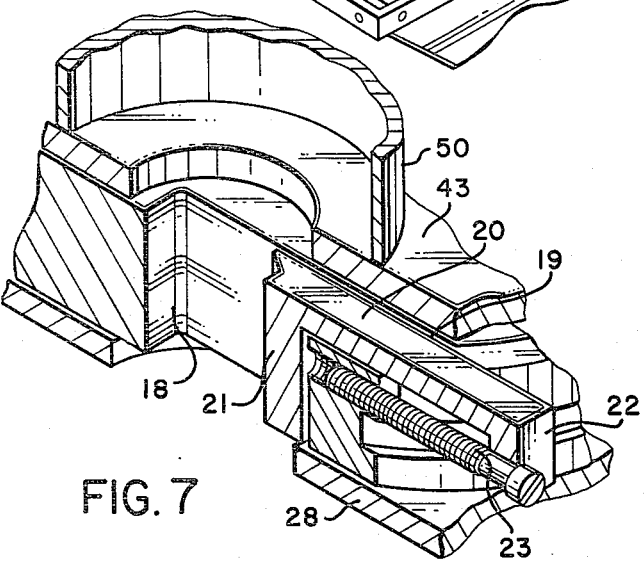
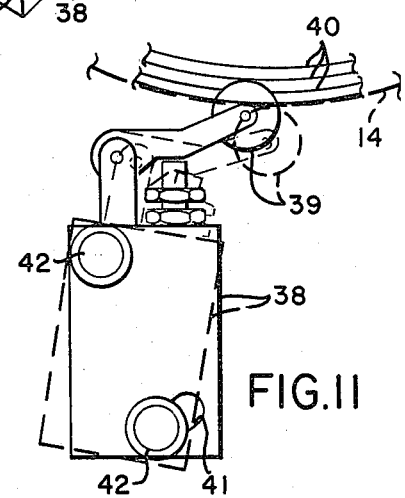
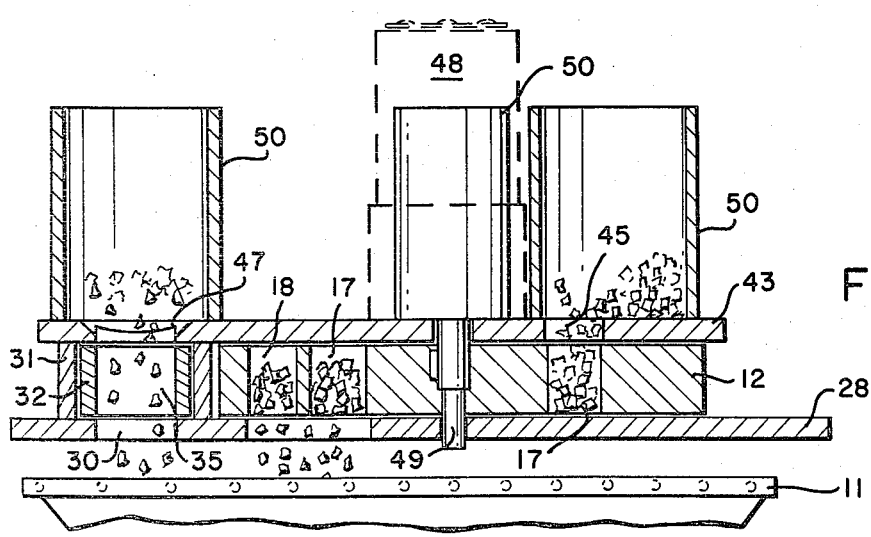

BATCH MATERIAL BLENDER AND METHOD THEREFOR

This invention relates to an apparatus and method for blending together a variety of appropriate materials in specific but variable quantitative relationships. Such furthermore, and more specifically, pertains to the extrusion, molding or casting of thermoplastics or other like materials wherein it is desired to blend together virgin and reprocessed plastic materials with a color concentrate or a plurality of such concentrates.

In the molding or formation of articles from moldable resins or plastic materials, the raw materials or resins (virgin and/or reprocessed) and masterbatched colorants used are usually in comminuted or granulated form. In feeding these to, for example, an injection molding machine, it is imperative that the materials be accurately measured to assure consistency in product produced. Difficulties have been encountered in providing a satisfactory material metering or measuring means which will achieve this result in as speedy and predictable fashion as is required on a commercially practicable operation.

The present invention embraces the provision of apparatus including a combined material measuring and transferring means wherein an accurate measure or quantity of comminuted material may be quickly and automatically made and transferred to a position or station for conveyance into barrel and dies of the machine.

Another object of the invention resides in the provision of a combined measuring and transferring device for use in supplying raw materials, such as are enumerated above, to molding machines and which simultaneously measures a plurality of material quantities. Each measuring device or unit is further contemplated to be independently adjustable thereby enabling the user to independently vary the quantities of raw materials supplied or transferred by each measuring unit to the molding machine hopper and batch feeder.

Another objective of the invention, resides in the provision of a material measuring and transferring device wherein a plurality of differing molding machine batch materials may be quickly and accurately blended without intermediate handling as they move from their independent bulk storage locations to each molding machine hopper.

Still another objective of the invention is to provide an easily adjustable device wherein each of the quantities of materials being introduced to the molding machine may be varied to accommodate product requirements.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 4 is yet another exploded view similar to FIG. 3 which further reveals the interrelationship of the various elements;

FIG. 5 is a cross-sectional view taken along line 5—5 of FIG. 1 which illustrates the transfer of metered materials from the device to the molding machine hopper;

FIG. 6 is a further partial cross-sectional perspective view related to FIG. 5 and with certain elements removed for purposes of clarity which shows how separate materials are discharged through a single aperture;

FIG. 7 is a partial cross-sectional view taken along line 7—7 of FIG. 3 which more completely depicts the adjustment features of one of the measuring and transference elements of the device;

FIG. 8 is partial cross-sectional view of another of the measuring and transference elements of the device taken along line 8—8 of FIG. 1;

FIG. 9 is a further partial cross-sectional perspective view related to FIG. 8 illustrating the transfer mode of such element;

FIG. 10 is a partial perspective view of the controlling arrangement for the measuring and transfer element shown in FIGS. 8 and 9; and FIG. 11 is an additional plan view of the controlling arrangement illustrating the adjustable features thereof.

Figure 1:
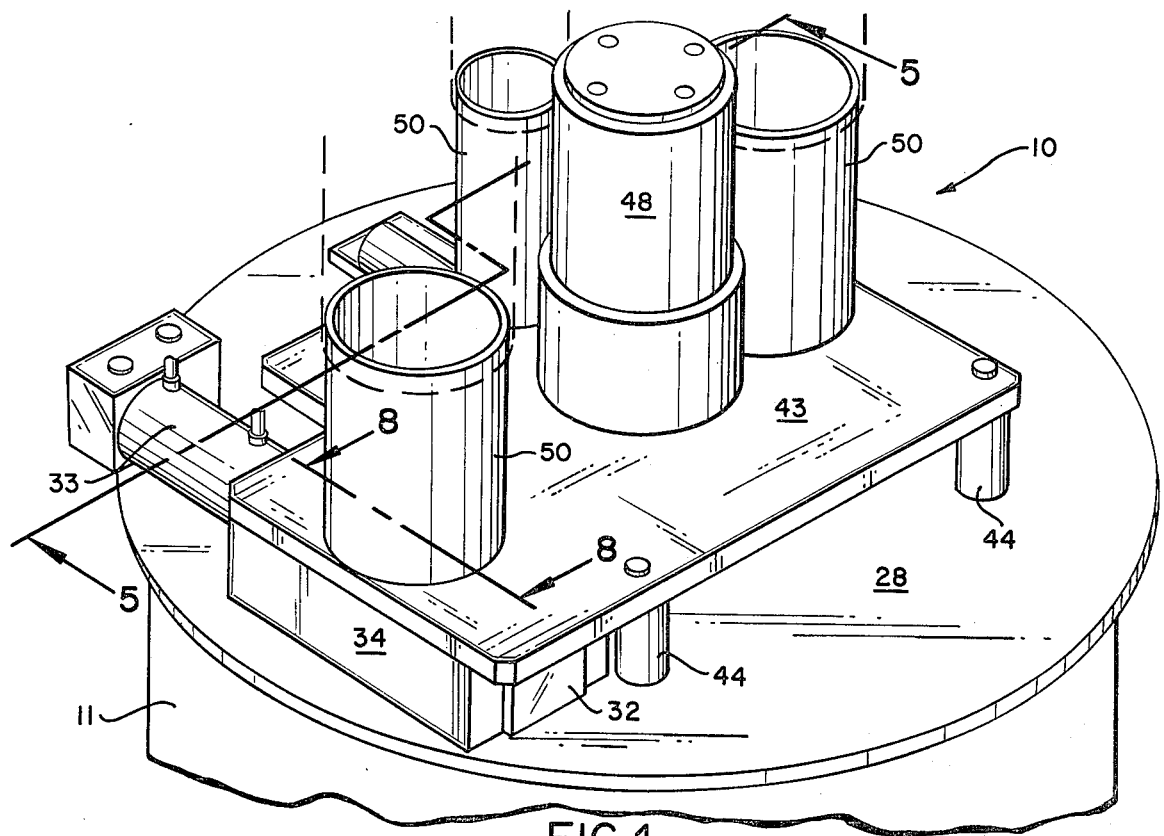
FIG. 1 is a top perspective view of the measuring and transferring device shown in position on a molding machine hopper and connected to hose delivery members which are adapted to convey materials thereto.
Figure 2:
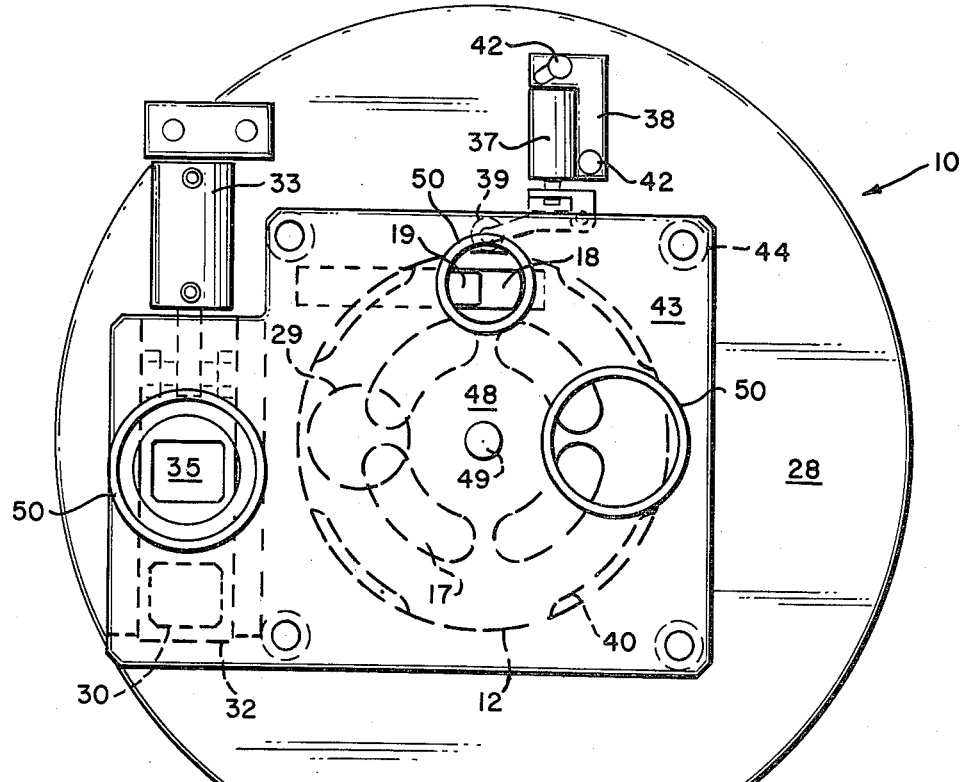
FIG. 2 is a top plan view of the device.
Figure 3:
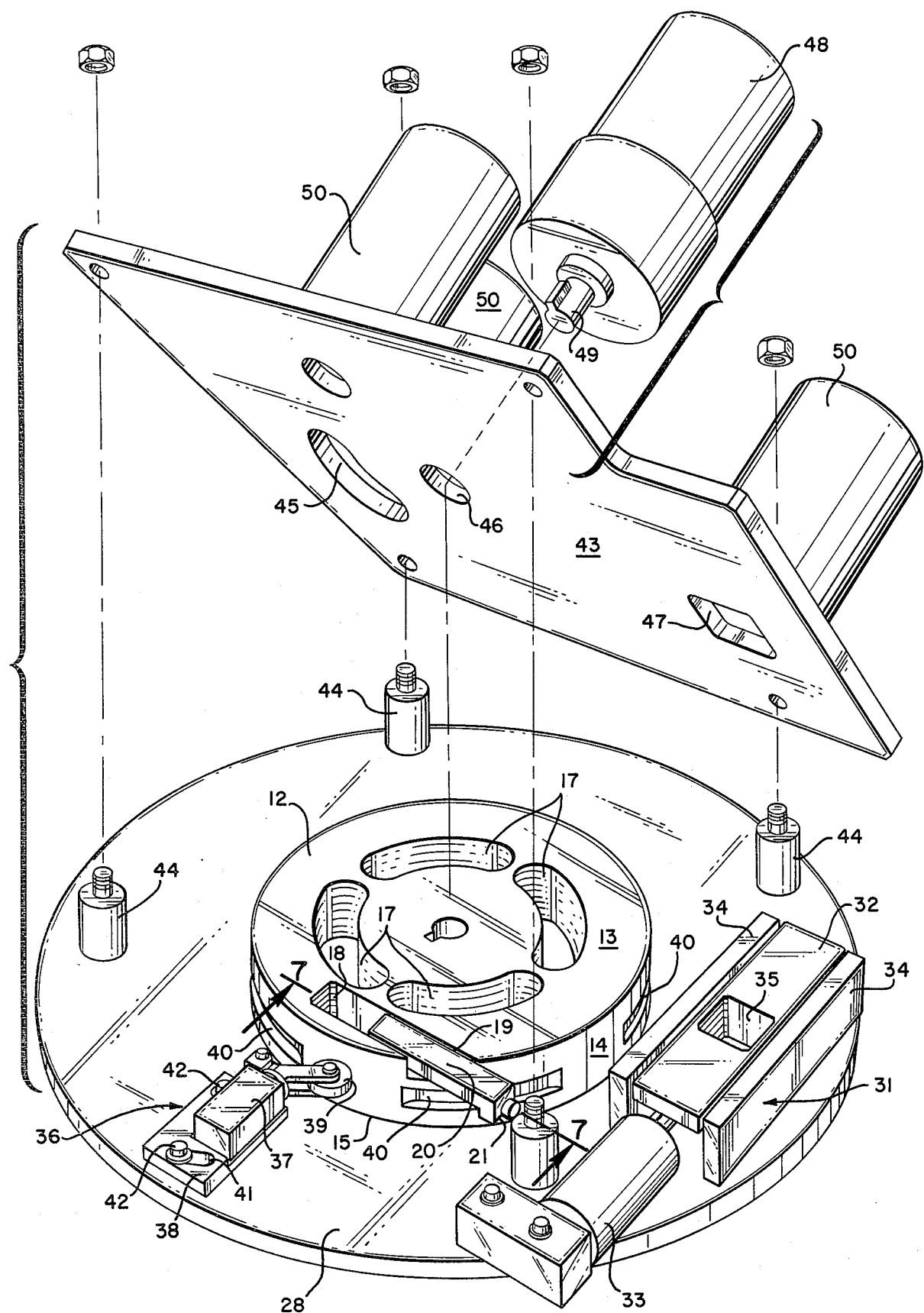
FIG. 3 is an exploded perspective view of the measuring and transferring device illustrating the metering and transfer elements of the device as well as their interrelationships.

While a form of the invention is illustrated which may be preferred for measuring, transferring and feeding or discharging resinous raw materials to a molding machine, it is to be understood that the principles of the invention may be incorporated with any apparatus where the same may be found to have utility.

Referring now to FIGS. 1, 2, 3 and 4 one may obtain a better appreciation of the overall construction of measuring and transferring device 10 adapted for incorporation upon an integral hopper 11 of any suitable molding apparatus. Furthermore, with particular reference to FIGS. 3 and 4, such device may be seen to incorporate a conveyor member 12 as one of its principal elements. This member 12 is preferably of a circular configuration with a top surface 13, bottom surface 14 and peripheral surface 15. Likewise, it is anticipated that member 12 will be rotably movable about an axis 16 and that such will include a plurality of arcuate, slot-like openings 17 positioned like radial distances from member axis 16 and which extend between top and bottom surfaces 13, 14.

In addition, the preferred construction of member 12 also contemplates another opening 18 extending between surfaces 13, 14 which opening is radially offset from the arcuate slot-like openings 17. The latter mentioned radially offset opening 18 may have its volumetric capacity varied by closuring means, bar 19. Such includes runner 20 of a width approximating that of opening 18, a depending tongue 21 of similar width and of a height approximating the thickness of conveyor 12 and control lip 22 oppositely positioned from tongue 21 (FIG. 7).

The bar 19 including tongue 21 and portions of runner 20 are positionable in opening 18 and is slidably movable there by some suitable adjustment means, for example, screw 23. Screw 23 is threaded into conveyor 12 by way of tapped hole 24 and a hemispherical slot 25 in bar lip 22 is adapted for engagement with screw 23 between the threaded portion 26 and head 27 thereof.

Accordingly, by rotating screw 23 bar 19 is movable longitudinally within and across the top of opening 18 from a position of maximum volumetric capacity therefor to a position of zero capacity. To assist the user in properly positioning bar 19 it is anticipated that suitable indicia will be placed thereon to identify various selected volumes of opening 18.

The conveyor member 12 is supported on a bottom plate 28 which has a principal aperture 29 and an additional aperture 30 therethrough (FIG. 4). As is apparent in certain positions of conveyor member 12, the openings 17 and 18 in such member will overlie aperture 29 and whatever materials have been accumulated in those openings will obviously exit through opening 29 by means of gravity. This plate 28 is additionally constructed to support another feed means 31 that is comprised of a slide 32, actuator means, 33 for example, a fluid motor and guide rails 34 (FIGS. 8 and 9).

Slide 32 includes an orifice 35 therethrough which orifice is adapted in one position to accumulate a predetermined volume of material (based upon orifice dimensions) and in yet another position discharge such material through aperture 30 in bottom plate 28. The movement of the slide between these respective positions is effected by fluid motor 33 and guide rails 34 which maintain the proper slide alignment thereof.

Additionally, plate 28 mounts the control means 36 (FIS. 10 and 11) which activates fluid motor 33 and the various movements of slide 32. Such includes a microswitch or similar arrangement 32 which is fixed to a support plate 38. The switch 37 further includes a cam follower 39 that is adapted to ride on peripheral surface 14 of conveyor member 12. In the preferred embodiment surface 14 incorporates a plurality or grooves 40 into which cam follower 39 may project during conveyor rotation. Accordingly, this surface 14 effectively acts as a cam whose configuration controls the operation slide 32 through switch 37, motor 33 and whatever other circuitry or the like may be selectively included to achieve the desired operative motions.

As have been indicated previously, it is an objective of the invention to be able to vary quantitatively the amount of material measured into and conveyed to the molding machine hopper 11. (FIGS. 1 and 5). This object is also desired in the operation of feed means 31 and is achieved by pivotally mounting support plate 38 to bottom plate 28 (FIGS. 3, 4, 10 and 11). This is accomplished by arcuately slotting support plate 38 as at 41 and mounting that plate to plate 28 by means of cap screws 42 or some similar holddown device, one of which passes through the slot 41. The other of the two hold-down devices therefore, acts as a pivot point (FIGS. 3 and 10) about which plate 38 may restrictively rotate thereby selectively positioning cam follower 39 with respect to conveyor 12. By such positioning the degree of engagement of follower 39 with peripheral wall 14 is selectively controlled. Furthermore, each of the mentioned grooves 40 is of a different depth and this similarly affects the interrelationship between these parts (FIG. 11).

The conveyor member 12, closuring means 19 and feed means 31 are all further sandwiched by a top plate 43 which is fixedly spaced from bottom plate 28 by posts 44. Top plate 43 exhibits first, second and third passageways 45, 46 and 47 respectively, which extend therethrough. Passageway 45 is aligned and cooperates with openings 17 in conveyor member 12 while 46 similarly relates to radially offset opening 18. Additional passageway 47 aligns and cooperates with orifice 35 in slide 32.

Top plate 43 therefore, acts as the inlet control means for the measuring and transfer device 10 while bottom plate 28 controls the discharge of conveyed material. Of course, the device 10 also includes a driving means 48 which may take any typical motor form. Such is positioned on top plate 43 with its driving axle 49 protruding through it, conveyor member 12 and into bottom plate 28. The axle 49 is of course keyed to conveyor 12 so that its rotation effects the conveyor rotation.

Furthermore, to assist in the orderly transfer of material to device 10 there are affixed to top plate 43 a plurality of stub-like conduits 50. These overlie the respective passageways 45, 46 and 47 and are sized to accept and retain delivery hoses which lead to material bulk storage bins.

In operation selected materials for use in the molding machine will be conveyed to the measuring and transferring device 10 via delivery hose systems. A continuous supply of such materials will therefore, be available at and in conduits 50. Motor 48 which is intermittently operable, dependent upon the amount of material in hopper 11, rotably moves conveyor member 12 in which the openings 17 and 18 have been set to accommodate predetermined amounts of material. During this movement, openings 17 and 18 traverse beneath passageways 45 and 47 and conduits 50 and are filled with the respective materials. As rotation continues, these same openings align with aperture 29 thereby effecting material discharge into hopper 11.

Simultaneously, with and due to the rotation of conveyor 12, feed means 31 will be activated and its degree of reciprocable movement will be determined by the setting of plate 38. That setting will control which of the grooves 40 will determine the movement of slide 32. Nonetheless, during each revolution of axle 49 conveyor 12 will measure predetermined quantities of two materials and transfer same to hopper 11.

Any suitably controlling means may be employed to effect the operation described and does not form a part of this invention. It is further apparent that, within the scope of the invention, modifications and different arrangements may be made other than is herein disclosed, and the present disclosure is illustrative merely, the invention comprehending all variations thereof.

I claim:

1. A material measuring and dispensing device for supplying predetermined quantities of a plurality of fluent materials to a molding apparatus and including:

a rotary conveyor member having top, bottom and peripheral surfaces, said member further including at least two trap chambers for reception of material to be measured and extending between said top and bottom surfaces;

at least one of said at least two trap chambers being of a fixed volumetric capacity and at least another one of said at least two trap chambers being adapted for adjustably varying the volumetric capacity thereof;

a bottom plate juxtaposed with the bottom surface and supporting said conveyor member for rotary movement and including at least one aperture therethrough and with which said at least two trap chambers communicate during certain segments of rotation of said conveyor member for dispensing material measured by said trap chambers;

a top plate affixed and spaced from said bottom plate in juxtaposition with said conveyor member top surface and including at least two inlet passageways for communicating said at least two trap chambers with a supply of material during rotation of said conveyor member; and, driving means attached to said conveyor member to provide rotary movement thereto.

2. A material measuring and dispensing device according to claim 1 wherein of said at least two trap chambers at least one is radially offset from the other and wherein all such trap chambers are aligned with said at least one aperture during rotation of said conveyor member.

3. A material measuring and dispensing device according to claim 2 wherein several of said at least two trap chambers are arcuately extending slots that align with one of said top plate passageways and a second of said passageways is provided in said top plate which aligns with said radially offset trap chamber.

4. A material measuring and dispensing device according to claim 2 wherein said conveyor member supports a closuring means for said least one radially offset trap chamber, said closuring means being adjustably positionable with respect to the radially offset trap chamber so as to adjustably vary the volumetric capacity thereof.

5. A material measuring and dispensing device according to claim 4 wherein said conveyor member includes a groove aligned with said offset chamber, and said closuring means includes an adjustable bar movable within said groove and chamber by adjustment means associated therewith.

6. A material measuring and dispensing device according to claim 5 wherein said adjustment means includes a screw engaging both said bar and conveyor member such that the rotation thereof moves the bar with respect to said conveyor member.

7. A material measuring and dispensing device according to claim 1 wherein the peripheral surface of said conveyor member is a configured cam surface.

8. A material measuring and dispensing device according to claim 7 wherein the configuration of said cam surface is varied so as to effect different responses with respect thereto.

9. A material measuring and dispensing device according to claim 8 wherein there is provided in said top and bottom plates yet an additional passageway and aperture respectively and feed means movable in communication therewith, said feed means being positioned between said plates and including an orifice positionable in alignment with one or the other of said additional passageway or aperture depending upon the position thereof; and actuator means in engagement with said feed means to effect the movement thereof.

10. A material measuring and dispensing device according to claim 9 wherein a cam follower is positioned for adjustable engagement with said cam surface, and control means interconnected with said cam follower and said actuator means position and move said feed means responsive to the interrelationship of said cam surface and cam follower.

11. A material measuring and dispensing device according to claim 10 wherein said actuator means is comprised of a fluid motor and said control means is a valving device.

12. A material measuring and dispensing device according to claim 10 wherein said cam follower is pivotally adjustable so that the degree of engagement with said cam surface may be varied.

13. A material measuring and dispensing device according to claim 2 wherein suitable conduits are affixed to said top plate and overlie said chambers so as to accommodate the delivery of fluent material thereto.

14. A material measuring and dispensing device according to claim 10 wherein suitable conduits are affixed to said top plate and overlie said passageways so as to accommodate the delivery of fluent material thereto.

15. In combination molding apparatus having a moldable material hopper as an integral part thereof and a material measuring and dispensing device for supplying comminuted moldable material thereto and including:

a rotary conveyor member having top, bottom and peripheral surfaces, said member further including at least two trap chambers for reception of material to be measured and extending between said top and bottom surfaces;

at least one of said at least two trap chambers being of a fixed volumetric capacity and at least another one of said at least two trap chambers being adapted for adjustably varying the volumetric capacity thereof;

a bottom plate juxtaposed with the bottom surface and supporting said conveyor member for rotary movement and including at least one aperture therethrough and with which said at least two trap chambers communicate during certain segments of rotation of said conveyor member for dispensing material measured by said trap chambers;

a top plate affixed and spaced from said bottom plate in juxtaposition with said conveyor member top surface and including at least two inlet passageways for communicating said at least two trap chambers with a supply of material during rotation of said conveyor member; and, driving means attached to said conveyor member to provide rotary movement thereto.

16. In combination molding apparatus having a moldable material hopper as an integral part thereof and a material measuring and dispensing device for supplying comminuted moldable materials thereto according to claim 15 wherein there is provided in said top and bottom plates yet an additional passageway and aperture respectively and feed means movable in communication therewith, said feed means being positioned between said plates and including an orifice positionable in alignment with one or the other of said additional passageway or aperture depending upon the position thereof; and actuator means in engagement with said feed means to effect the movement thereof.

17. A method for simultaneously measuring and transferring a plurality of comminuted moldable materials to a molding apparatus and including the steps of:
(1) adjusting the volumetric measuring capacity of at least one segment of the measuring and transfer device to a predetermined value;
(2) delivering a plurality of comminuted moldable materials to that portion of the measuring and transfer device of which at least one segment has been volumetrically adjusted;
(3) moving said portion of said measuring and transfer device so that measured volumes of material are discharged from said device during each cycle of movement to said molding apparatus; and
(4) intermingling said materials at and subsequent the discharge thereof from said device.

18. A method for simultaneously measuring and transferring a plurality of comminuted moldable materials to a molding apparatus according to claim 17, wherein the movement of said portion is monitored and an additional portion of said measuring and transfer device is volumetrically adjusted and moved to discharge yet another comminuted moldable material responsive to said movement and intermingling said yet another material with said materials.

19. A method for simultaneously measuring and transferring a plurality of comminuted moldable materials to a molding apparatus according to claim 18, wherein the monitoring means is adjusted to control the volumetric capacity of said additional portion.

20. A material measuring and dispensing device for supplying predetermined quantities of a plurality of fluent materials to a molding apparatus and including:
- a rotary conveyor member having top, bottom and peripheral surfaces said member further including at least two trap chambers for reception of material to be measured and extending between said top and bottom surfaces;
- at least one of said at least two trap chambers being of a fixed volumetric capacity and at least another one of said at least two trap chambers being adapted for adjustably varying the volumetric capacity thereof;
- a bottom plate juxtaposed with the bottom surface and supporting said conveyor member for rotary movement and including at least one aperture therethrough and with which said at least two trap chambers communicate during certain segments of rotary movement of said conveyor member for dispensing material measured by said trap chambers;
- a top plate affixed and spaced from said bottom plate in juxtaposition with said conveyor member top surface and including at least two inlet passageways for communicating said at least two trap chambers with a supply of material during rotary movement of said conveyor member; and,
- driving means attached to said conveyor member to provide rotary movement thereto.

* * * * *